United States Patent [19]

Wear

[11] 4,014,855

[45] Mar. 29, 1977

[54] POLYHALOGENATED AROMATIC COMPOUNDS AND POLYMERS THEREOF

[75] Inventor: Robert L. Wear, West St. Paul, Minn.

[73] Assignee: Minnesota Mining and Manufacturing Company, St. Paul, Minn.

[22] Filed: Nov. 14, 1974

[21] Appl. No.: 523,670

[52] U.S. Cl. .............................. 260/47 C; 260/61; 260/333

[51] Int. Cl.² ........................................ C08G 63/66

[58] Field of Search .................... 260/47 C, 61, 333

[56] References Cited

UNITED STATES PATENTS

| | | | |
|---|---|---|---|
| 3,824,213 | 7/1974 | Stackman | 260/47 C |
| 3,864,448 | 2/1975 | Stackman et al. | 264/205 |
| 3,873,504 | 3/1975 | Boettchere et al. | 260/47 C |

Primary Examiner—Lester L. Lee
Attorney, Agent, or Firm—Cruzan Alexander; Donald M. Sell; Donald C. Gipple

[57] ABSTRACT

Polyhalogenated aromatic copolymers and the intermediate 3,3-bis(polyhalophenoxymethyl)oxetanes and 2,2-bis(polyhalophenoxymethyl)-1,3-propanediols.

12 Claims, No Drawings

POLYHALOGENATED AROMATIC COMPOUNDS AND POLYMERS THEREOF

FIELD OF THE INVENTION

This invention relates to a class of polyhalogenated aromatic copolymers. The copolymers of major interest are saturated, high molecular weight polyesters suitable for use as strong fibers and films. In another aspect the invention relates to a class of 3,3-bis(-polyhalophenoxymethyl)oxetanes which are intermediates in the preparation of the copolymers. In still another aspect, the invention relates to a class of 2,2-bis(-polyhalophenoxymethyl)-1,3-propanediols which are also intermediates in the preparation of the copolymers.

BACKGROUND OF THE INVENTION

High molecular weight, linear, saturated polyesters, as typified by polyesters of ethylene glycol and terephthalic acid, have found wide acceptance in the form of fibers (or filaments) and films as well as other configurations. They are, in general, colorless or clear, high melting, thermally and hydrolytically stable and are capable of being oriented, either mono- or biaxially, into extremely strong crystalline materials.

These polymers are, however, flammable and this places serious limitations upon their use in particular areas, for example in clothing (particularly children's clothing) in the form of fibers, and in electrical components, such as capacitors, in the form of films. Attempts have been made heretofore to improve the flame retardance of high molecular weight saturated polyester films, for instance by including halogen-containing additives therein. This has not been entirely satisfactory, however. Thus when such additives are mixed into the polymer batch before extrusion they may bloom out of the finished film over a period of time, or they may be removed (e.g. by contact with a porous solid or by solvent extraction). This has the effect of reducing the surface adhesion properties and transparency of the finished film or fiber. In addition, where the halogen-containing additive is removed, the flame retardance itself is lost.

Migration can be overcome or reduced by chemically binding flame-retardant agents in the polymer chain and, indeed, chemically-bound flame retardant agents, for example halogenated organic compounds, have been utilized in low to intermediate molecular weight unsaturated polyesters. Such polyesters have been of the amorphous (non-crystalline), relatively low melting, nitrogen type which are generally suitable for use in the reinforced plastics and moulding arts but are unsatisfactory for use as film and fibers. Chemically bound flame retardants have not, however, been widely or successfully used in the high molecular weight linear saturated polyester area since they have been found to seriously and adversely affect the high melting points, high crystallinity, high thermal stability and high hydrolytic stability of these polymers (the combination of properties which make them valuable in the film and fiber areas).

As will be seen, the polymers of the present invention incorporate relatively large amounts of halogen (rendering them highly flame resistant) and at the same time retain the physical properties necessary for high quality films and fibers. It is this balance of properties which renders them especially valuable for use as flame resistant, high strength films and fibers.

THE PRESENT INVENTION

The present invention relates to a class of copolymers containing recurring units of the formula

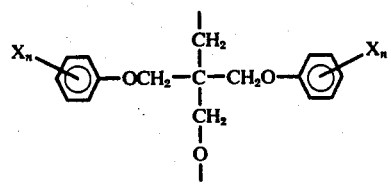

wherein X is selected from Br and Cl and each $n$ is 3 to 5 and wherein said copolymers preferably contain at least about 5 percent halogen (on a weight basis) as it is present in these recurring units. These units are residues of oxetane or diol intermediate compounds which correspond respectively to the formulae

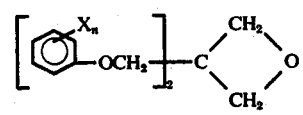

wherein X is selected from Br and Cl and each $n$ is 3 to 5; and

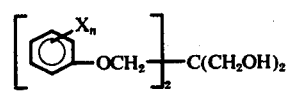

wherein X is selected from Br and Cl and each $n$ is 3 to 5, provided, however, that one $n$ must be 3. These compounds are discussed more fully hereinafter and constitute other distinct aspects of the invention.

In certain copolymers of the invention, the units I recur regularly (as in a copolyester of intermediate diol or oxetane with a simple dibasic acid). In such cases the unit made up of the residues of the diol or oxetane and the dibasic acid is the repeating unit of the polymer. Thus, the repeating unit of the copolyester of a diol or oxetane of the invention and terephthalic acid has the formula

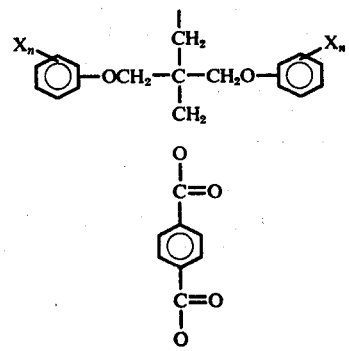

This type of polyester is a particularly preferred subclass of the invention. The end groups of these polymers will be diol or diacid residues, depending generally upon the molecular ratio of the diol (or oxetane) and the diacid in the polymerization charge. In other types of polyesters of the invention, additional monomers may be included and the recurring unit I will occur randomly. The end groups in these other polymers will also depend upon the ratios of the monomers charged. The end groups in all of the polyesters may be modified by the addition of other reagents such as chain transfer agents, etc. as in known to those skilled in the art.

Preferably the polymers of the invention are polyesters, although polyethers containing recurring units of the type I are also included. These polyesters are prepared by an efficient process which is well adapted to large scale production. They have a high degree of flame resistance and retain the properties necessary to the production of high performance fibers and films. Of particular interest and importance in these polyesters is their high degree of thermal stability. This is considered to be essential since the polymers must go through a relatively high temperature polymerization cycle and a relatively high temperature film or fiber extrusion cycle (both in the range of about 280° C). The resultant films and fibers are also free of additive migration, are clear and have good surface adhesion properties.

Three procedures are of primary interest in preparing copolyesters according to the present invention. They are as follows:

1. Reacting an oxetane according to the invention with a dicarboxylic acid and optionally and preferably with a glycol.
2. Reacting an oxetane with a dicarboxylic ester (such as a methyl or ethyl ester) and a glycol. The glycol is necessary here because the ester of the dicarboxylic acid and the oxetane will not react in the absence of the glycol.
3. Reacting a diol according to the present invention with a dicarboxylic acid or a dicarboxylic acid ester with or without a second glycol.

Procedure (1) is preferred over procedure (2) since the reaction product appears to be more free of color when the oxetane is reacted with the diacid than when it is reacted with the diester.

The copolyesters of the preent invention can be prepared by any of the methods known to the art. For example the rectants may be combined in a suitable vessel and heated, for example, to about 200° C. at atmospheric pressure until any methanol or water formed has been removed. The reactants may then be heated, for example, to about 280° C under vacuum (suitably at a pressure of less than 1 millimeter of mercury) until a relatively high intrinsic viscosity (e.g. 0.4) has been obtained. Alternatively the reaction may be carried out by heating the reactants, for example, to about 200° C under greater than atmospheric pressure (e.g. 50 p.s.i.) followed by additional heating, for example, to about 280° C while the pressure is reduced to about 1 millimeter of mercury until a relatively high intrinsic viscosity (e.g. 0.4) has been reached.

Preferably in the preparation of the polyesters from the reaction of either the oxetanes or the diols of the invention with dicarboxylic acids, a saturated aliphatic glycol containing from 2 to about 10 carbon atoms is added in order to obtain higher melting points, greater crystallinity and more insolubility in the resulting products. Illustrative examples of suitable glycols are ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,4-cyclohexanedimethanol, etc. Particularly it is preferred to use ethylene glycol in order to maximize these properties.

While a variety of dicarboxylic acids or their anhydrides may be used in the preparation of the polyesters, either terephthalic or isophthalic acid is preferred. Terephthalic acid is most preferred since its use results in higher melting and more insoluble products.

Other substances may also be added in order to catalyze the polymerization reaction. Representative examples of these catalysts include antimony trioxide, lithium acetate, antimony oxide, and zinc acetate dihydrate. Other catalysts of the type described are well known to the art.

As noted previously, the copolyesters of the invention preferably contain at least about 5 percent of halogen. More preferably they contain from about 5 to 20% of halogen on a weight basis. Thus, halogen levels below about 5% have little effect on the flammability while at levels above about 20 weight percent the strength and film forming properties (e.g. tensile elongation, etc.) as well as thermal stability are substantially reduced. Preferably when the halogen is bromine the polyesters will contain from about 5 to 15% of halogen on a weight basis and, when the halogen is chlorine they will contain from about 15 to 20% halogen, More preferably the halogen is bromine and the halogen content in the polyesters is from about 7 to 12%, most preferably about 10%.

A particularly preferred class of copolyesters of the present invention are those having the following combination of properties: Intrinsic viscosity of at least about 0.4, as measured in a ½% solution in trifluoroacetic acid at 30° C.; Limited Oxygen Index (glass wrapped) of at least about 25 (the method for determining this value is described below); melting point (as determined by the Fisher-Johns method) in the range of 230°–250° C.; substantially complete solubility in trifluoroacetic acid at 50° C. in the ratio of 5 parts by weight of polymer to 95 parts of solvent; and capability of forming films which can be stretched biaxially to at least four times their original areas to form crystalline films having tensile strengths of at least about $0.5 \times 10^3$ kg/sq. cm.

The polyhalogenated oxetanes of the present invention (II) can be prepared by heating a suitable polyhalophenol together with 3,3-bischloromethyl oxetane in dimethylformamide solvent in the presence of potassium carbonate. The reaction is ordinarily carried out at atmospheric pressure and under an inert atmosphere, preferably nitrogen. The resulting compound can be designated a 3,3-bis(polyhalophenoxymethyl)oxetane. The useful polyhalophenols include 2,4,6-tribromophenol, pentabromophenol, 2,4,6-trichlorophenol, tetrachlorophenol and pentachlorophenol. They may be used individually or combined so that the degree of halogenation of each of the polyhalophenoxymethyl groups is different. When it is desired that the degree of halogenation of the two polyhalophenoxymethyl groups in a compound be different the reaction is carried out by first reacting one of the polyhalophenols with excess 3,3-bischloromethyl oxetane and recovering the resultant intermediate (e.g. 3-[polyhalophenoxymethyl]-3-[chloromethyl]-oxetane). This intermediate is then reacted with a second polyhalophenol under essentially the same conditions.

The diols of the present invention (III) can be prepared by hydrolyzing the corresponding polyhalophenoxymethyl oxetane (II) in the presence of concentrated sulfuric acid, dioxane solvent and water by refluxing at atmospheric pressure, and a temperature of approximately 90° C. The resulting compound can be designated 2,2-bis(polyhalophenoxymethyl)-1,3-propanediol.

The degree of flame resistance of the polymers of the present invention is measured by means of a Limited Oxygen Index (glass wrapped) (L.O.I.) test which determines the percentage of oxygen in a slowly rising stream of gas which is required to just sustain "candle type" burning of a vertically supported sample. This is a very sensitive test which is capable of distinguishing between various degrees of flammability.

In the L.O.I. test (which is a modification of ASTM test method D-2863-70) a test specimen having a length of from about 13 to 15 centimeters, a width of about 5 centimeters, and a thickness from about 0.0025 to 0.025 millimeters (1 to 10 mils) is utilized. Because the polyester material being tested tends to melt and drip away from flame, additional sample support is provided as follows: Glass cloth (e.g. Burlington Style 104, 1 mil thick, 0.60 oz/sq.yd., WXF=60×52) is attached to each side of the polyester sample by heating the film edges with a soldering iron, and by running the iron down the middle of the sample length and across the width at about one-third and two-thirds of the way from the bottom of the sample. The glass cloth must be adhered well enough to prevent edge rollover but care must also be taken to prevent conversion of an undue amount of the sample into its amorphous state since this gives misleading results. The excess glass cloth is then trimmed away and the sample is clamped vertically at its bottom end in a U-shaped clamp (thus bending the sample so that it has a U-shaped cross section which further stiffens the sample and causes it to remain vertical). The sample is placed (vertically) in the center of a glass column having a minimum inside diameter of about 7.5 centimeters and a minimum height of about 45 centimeters in such a position that its top is at least 10 centimeters below the top of the column. The bottom of the column contains noncumbustible material to mix and distribute evenly a mixture of oxygen and nitrogen entering at the base.

The gas mixture is adjustable so that various known blends of oxygen and nitrogen may be supplied. The L.O.I. value reported for a given polymeric film is the lowest percentage (by volume) of oxygen in the mixture of oxygen and nitrogen which is required to sustain combustion of the sample sufficient to burn away the top 5 cm. of the sample in 3 minutes. It is calculated according to the formula L.O.I. $= (100 \times O_2)/(O_2 + N_2)$ where $O_2$ is the volumetric flow rate of oxygen in cubic centimeters per second at the limiting concentration and $N_2$ is the corresponding flow rate of nitrogen in cubic centimeters per second at the limiting concentration. The test is accurate to approximately one L.O.I. number. An L.O.I. above 21, the percentage of oxygen in ordinary air at sea level, indicates flame retardency. The higher the L.O.I. value obtained, the greater is the flame retardency of the sample tested. L.O.I. values above 22 are desirable if the sample is to be considered "flame resistant."

To determine the L.O.I. of a given film, a sample is prepared and mounted in the apparatus and a gas mixture containing known proportions of oxygen and nitrogen (expressed in percent by volume) is introduced into the column so that it is moving up and around the sample at a flow rate of 3 to 5 cubic centimeters per second. A flame is applied to the top of the sample until it is well lit and the entire top is burning (if this is possible in the atmosphere being used) and the flame is then removed. The sample is observed to determine whether the top 5 cm. are burned away in 3 minutes. Several runs are made on samples of the same film (varying the content of oxygen in the gas mixture by one percent increments) until the L.O.I. value has been determined.

The following examples will further illustrate the practice of the present invention. Unless otherwise indicated, the melting point determinations were made by the Fisher-Johns method and intrinsic viscosities were run at 30° C. as ½% solutions in various solvents. It is noted that the particular method of determining the melting point (whether by the Fisher-Johns or the Mettler method) makes relatively little difference in the value obtained. Furthermore, the various solvents used in determining the intrinsic viscosity measurements make essentially no difference in the value obtained. All of the polyester products of Examples 7-16 can be described as containing from 5 to 20 percent halogen, having melting points inthe range of 230°-250° C. (as determined by the Fisher-Johns method), being substantially completely soluble in trifluoroacetic acid at 50° C. in the ratio of 5 parts by weight of polymer to 95 parts of solvent (and thus not being crosslinked) having a L.O.I. value of at least about 25 and capable of forming films which can be stretched biaxially to at least four times their original areas into crystalline films having tensile strength of at least about $0.5 \times 10^3$ kg/sq. cm.

EXAMPLE 1

Preparation of 3,3 bis[2,4,6-tribromophenoxymethyl]oxetane

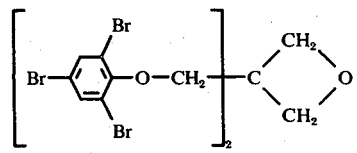

A 5 liter flask equipped with stirrer, thermometer, condenser and nitrogen inlet was used. 2,4,6-Tribromophenol (1390 g., 4.2 moles.), potassium carbonate (580 g., 4.2 moles), potassium iodide (10 g.) and dimethyl formamide (2 liters) were charged to the flask. The reaction was conducted in a nitrogen atmosphere. The stirred mixture was heated to 100° C. and 3,3-bischloromethyl oxetane (310 g., 2.0 moles) was added. The reaction mixture was heated to 120°-130° C. for 1½ hours, then to about 140° C. for 3 hours. The reaction mixture was stirred as it cooled. Crystals formed in the cooling mixture and 1.5 liters of water were added. After standing overnight, the heavy crystalline 3,3 bis[2,4,6-tribromophenoxymethyl]oxetane was collected by filtration. The crystals were washed ont he funnel with 5 portions of water and 3 portions of methanol. The oven dried product weighed 1427 g. (96%), and had a melting point of 142°-145° C. One kg. of this material was recrystallized from a mixture of 900 ml. of 2-butanone and 500 ml. of dioxane. The recrystallized product weighed 866 g., and had a melting point of 145°–146° C.

The 2,4,6-tribromophenol utilized in the foregoing preparation was obtained from Dow Chemical Company and the bischloromethyl oxetane was prepared as described in A. C. Farthing, J. Am. Chem. Soc., 67,942 (1945).

EXAMPLE 2

Preparation of
3-[2,4,6-tribromophenoxymethyl]-3-[pentabromophenoxymethyl]oxetane

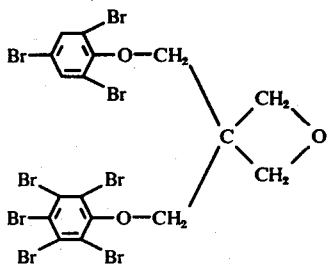

A mixture of 2,4,6-tribromophenol (33.1 g., 0.1 moles), potassium carbonate (15 g., 0.11 moles), dimethyl formamide (100 ml.) and 3,3-bischloromethyl oxetane (80 g., 0.52 moles) was stirred in a nitirogen atmosphere and slowly heated to 140°–145° C., and held for 2 hours. The cooled reaction mixture was filtered and the filtrate poured into 500 ml. of water. The upper layer was decanted and the lower layer subjected to steam distillation. The oily material remaining in the steam distillation residue solidified on standing. It was dissolved by heating with an ethanol/2-butanone mixture. A crystalline product, 3-[2,4,6-tribromophenoxymethyl]-3-[chloromethyl]oxetane, separated on cooling and was collected by filtration. The crystalline solid weighed 34.5 g., and had a melting point of 77°–81° C. A small sample recrystallized from an ethanol/ethyl acetate mixture melted at 80°–82 C.

To 31.5 g. (0.07 moles) of 3-[2,4,6-tribromophenoxymethyl]-3-[chloromethyl]oxetane was added pentabromophenol (36 g., 0.074 moles), potassium carbonate (10 g., 0.077 moles), potassium iodide (0.5 g.) and dimethyl formamide (75 ml.). The reactants were stirred in a nitrogen atmosphere and heated to 140°–148° C. for 2½ hours. The cooled reaction mixture was diluted with 500 ml. of water. The resulting solid 3-[2,4,6-tribromophenoxymethyl]-3-[pentabromophenoxymethyl]oxetane was collected by filtration and washed on the funnel with water and with ethanol. The yield was 48 g. (76%). A small sample recrystallized from dioxane (6 ml./g.) melted at 202°–204° C.

EXAMPLE 3

Preparation of
3,3-bis[pentabromophenoxymethyl]oxetane

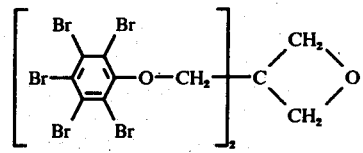

A mixture of pentabromophenol (100 g., 0.2 moles), potassium carbonate (30 g., 0.22 moles), potassium iodide (0.5 g.), dimethyl formamide (180 ml.) and 3,3-bischloromethyl oxetane (15.5 g., 0.1 moles) was stirred in a nitrogen atmosphere and heated to 143° C. for 5 hours. The partially cooled reaction mixture was poured into 1 liter of water. The resulting solid 3,3-bis[pentabromophenoxymethyl]oxetane was collected by filtration and washed on the funnel with water and with ethanol. The yield was 93 g. A small sample was recrystallized from a large volume of dioxane. The recrystallized material melted at 281°–284° C.

The pentabromophenol used herein was obtained from the Aldrich Chemical Co.

EXAMPLE 4

Preparation of
3,3-bis[pentachlorophenoxymethyl]oxetane

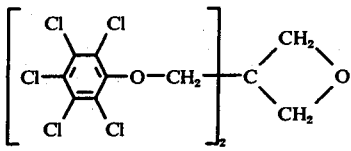

This reaction was carried out similarly to that described in Example 1. Pentachlorophenol (469 g., 1.86 moles), potassium carbonate (262 g., 1.9 moles), potassium iodide (4 g.) and 1.5 liters of dimethyl formamide were charged to a 3 liter reaction flask. The mixture was stirred and heated in a nitrogen atmosphere. When the temperature reached 95° C., 140 g. (0.9 moles) of 3,3-bischloromethyl oxetane was added. The reaction mixture was slowly heated to about 140° C. and held 3 hours. After cooling to 63° C., 700 ml. of water was added to the mixture. After standing overnight, the reaction mixture was filtered. The recovered crystalline 3,3-bis[pentachlorophenoxymethyl]oxetane was washed on the funnel with six portions of water, three portions of ethanol and three portions of 2-butanone. The yield of oven-dried, cream-colored crystals was 480 g. (87%). The compound melted at 229°–230° C. If desired, this compound can be recrystallized from dioxane.

EXAMPLE 5

Preparationof
2,2-bis(2,4,6-tribromophenoxymethyl)-1,3-propanediol

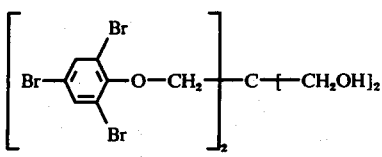

The crude oxetane of Example 1 (292 g., 0.392 moles), 900 ml. of dioxane, 60 ml. of water and 4 ml. of conc. sulfuric acid were stirred together and reluxed 24 hours. During the last hour, 300 ml. were removed by distillation and the reaction mixture was poured into 2½ liters of water. The gum which initially separated solidified on standing. The solid was collected by filtration, washed with water and with methanol. After drying, the yield of crude diol was 294 g. This was heated with 700 ml. of methyl ethyl ketone. Dioxane was then slowly added until the solid dissolved. The hot solution was filtered and the filtrate cooled. The recrystallized diol thus obtained weighed 242 g., and had a melting point of 154°–156° C. It was again recrystallized from 500 ml. of methyl ethyl ketone plus 200 ml. of dioxane to yield 214 g., of a purified product having a melting point of 155°–156° C. By concentration of the filtrates and recrystallizing the resulting crops, an additional 32 g. was obtained. Thus the yield was 246 g. (82%).

EXAMPLE 6

Preparation of 2-[pentabromophenoxymethyl]-2-[2,4,6-tribromophenoxymethyl]-1,3-propanediol.

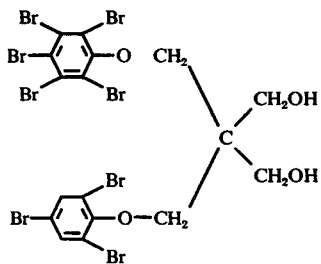

A mixture of the oxetane derivative of Example 2 (47.5 g., 0.053 moles), dioxane (290 ml.), water (10 ml.) and 1 g. of conc. sulfuric acid was stirred and refluxed 22 hours. The cooled reaction mixture was poured into 1.5 liters of water. A gummy solid formed which became crystalline when heated with dioxane. This product was recrystallized twice from dioxane, yielding 19.4 g. of the desired product which had a melting point of 184°–187° C.

EXAMPLE 7

Preparation of copolyester resin from dimethyl terephthalate, ethylene glycol and 3,3-bis[2,4,6-tribromophenoxymethyl] oxetane. Theoretical bromine content — 10%.

A mixture of dimethyl terephthalate (1552 g., 8.0 moles, ethylene glycol (1 liter, 17.9 moles), 3,3-bis[2,4,6-tribromophenoxymethyl] oxetane (278 g.), zinc acetate dihydrate (0.776 g.) and antimony trioxide (0.388 g.) was charged to a one-gallon polymerization kettle. The reaction mixture was heated to from about 180° to 220° C. and the methanol formed was removed by distillation. Thereafter the temperature was raised slowly and the pressure was gradually reduced to remove ethylene glycol. The temperature reached approximately 280° to 285° C., the pressure was reduced to less than about 1 millimeter of mercury and the polymerization was continued until a relatively high viscosity was obtained. The viscosity was monitored roughly by the torque load on the stirrer. The resulting resin had an intrinsic viscosity of 0.5 (½% solution in tetrachloroethane solvent), was reddish brown in color, and the resin had a melting point of 240°–243° C. The intrinsic viscosity in a ½% solution in trifluoroacetic acid would also be about 0.5. A film was obtained by pressing the resin at 250° C. between Teflon sheets in a Carver Press. The L.O.I. value of this film was 28 (glass wrapped). Comparable polyethyleneterephthalate film had an L.O.I. (glass wrapped) of 22 and a melting point range of 255°–257° C.

EXAMPLE 8

Preparation of a copolyester resin from dimethyl terephthalate, ethylene glycol and 2-(pentabromophenoxymethyl)-2-(2,4,6-tribromophenoxymethyl)-1,3-propanediol. Theoretical bromine content — 10%.

A mixture of dimethyl terephthalate (58.2 g., 0.3 moles), ethylene glycol (41 g., 0.66 moles), the compound of Example 6 (9.6 g.), zinc acetate dehydrate (0.030 g.) and antimony trioxide (0.018 g.) was placed in a polymerization tube. This mixture was heated from about 180° to 220° C. and the methanol formed was removed by distillation. Thereafter the temperature was raised slowly, the pressure was reduced to less than about 1 millimeter of mercury and the polymerization was continued until a relatively high viscosity was obtained. At the end point of the polymerization the resulting polymer was reddish brown in color. It turned opaque on cooling. The copolyester melted at about 243°–248° C. A film was obtained by pressing the resin between Teflon sheets in the Carver Press at 250° C. This film had a L.O.I. value of 29 (glass-wrapped).

EXAMPLE 9

Preparation of a copolyester of terephthalic acid, ethylene glycol and 3,3-bis[2,4,6-tribromophenoxymethyl] oxetane. Theoretical bromine content — 10%.

A 2-gallon resin kettle capable of operating under pressure and vacuum was used for preparing this copolyester. Charged to the kettle were: terephthalic acid, 3350 g.; ethylene glycol, 1880 g.; 3,3-bis[2,4,6-tribromophenoxymethyl]oxetane, 705 g.; zinc acetate dihydrate, 0.91 g.; antimony oxide, 0.91 g., and lithium acetate, 0.23 g. The procedure used was similar to the conventional ethylene terephthalate polymerization procedure. Over a period of approximately 2 hours, the kettle was heated to 256° C. The kettle pressure was kept at about 50 psi as the water which evolved was removed from the system. The pressure was then released slowly and vacuum was applied to the kettle. Polymerization was carried out at 275°–280° C. for about 2 hours. The torque load on the stirrer incressed to the normal endpoint value for polyethylene terephthalate at which time vacuum was released and the polymerization was terminated. The resulting resin had an intrinsic viscosity of 0.58 (½% solution in phenol/tetrachloroethane) and a melting point of about 237°–240° C. The intrinsic viscosity in a ½% solution in trifluoroacetic acid would also be about 0.58.

EXAMPLE 10

A copolyester of terephthalic acid, ethylene glycol, and 3,3-bis(2,4,6-tribromophenoxymethyl)oxetane was prepared according to the procedures utilized in Example 9 except that 23 g. of triphenyl cyanurate (a coupling agent) was added to the kettle at the midpoint of the polymerization cycle. This resulted in an increased polymerization rate. The resulting resin had an intrinsic viscosity of 0.60 (½% solution in phenol/tetrachloroethane). The intrinsic viscosity in a ½% solution in trifluoroacetic acid would also be about 0.6. The theoretical bromine content was 10%.

EXAMPLE 11

A copolyester of terephthalic acid, ethylene glycol and 3,3-bis(2,4,6-tribromophenoxymethyl)-oxetane was prepared according to the procedure utilized in Example 9. A sample of the resin was ground and screened to a mesh size less than No. 6 and greater than No. 5. A stream of nitrogen heated to 200° C. was passed through the resin particles which were also at 200° C. Intrinsic viscosities (½% solutions in trifluoroacetic acid) were determined after various time intervals. The theoretical bromine content was 10%. The results show that solid state polymerization was effective for increasing the molecular weight of the copolyester resin.

| Time at 200° C | Intrinsic Viscosity |
| --- | --- |
| 0 hrs. | 0.47 |
| 2 hrs. | 0.54 |
| 4 hrs. | 0.60 |
| 6 hrs. | 0.66 |

EXAMPLE 12

The balance of the resin of Example 11 was then ground and solid state polymerized by passing a stream of nitrogen heated to 200° C through the heated (200° C.) resin particles for 8 hours. The solid state polymerized resin had an intrinsic viscosity of about 0.7 (½% solution in phenol/tetrachloroethane). The intrinsic viscosity in a ½% solution in trifluoroacetic acid would also be about 0.7. This resin was then extruded as a film, oriented in a lengthwise (machine) direction, oriented in the crosswise (tenter) direction, and heatset at 400° F. (204° C.) in one continuous operation. The theoretical bromine content was 10%. The film had satisfactory physical and electrical properties, very low 150° C. heat shrinkage, and good thermal and hydrolytic stability. Properties of the film were:

| | |
| --- | --- |
| Break strength | 19.5 × 10³ psi(1.37 × 10³ kg/sq. cm) |
| Break elongation | 79% |
| Density | 1.423 g/cc. |
| Melting point | 232° C (Mettler) |
| L.O.I. | 26 |

EXAMPLE 13

A copolyester resin of terephthalic acid, ethylene glycol, and 3,3-bis(2,4,6-tribromophenoxymethyl)oxetane was prepared according to he procedures of Example 9. The theoretical bromine content was 10%. The resin was then extruded into a 9 mil (0.023cm.) cast web using a 2.5 cm extruder. Samples of the cast web were biaxially oriented 3 × 3 to give a 1 mil (0.0025 cm.) film. Properties of this film were:

| | |
| --- | --- |
| Break strength | 20.8 × 10³ psi(1.46 × 10³ kg/sq. cm) |
| Break elongation | 115% |
| Density | 1.47 g/cc |
| Melting point | 240° C (Mettler) |
| L.O.I. | 29 |

EXAMPLE 14

The preparation of a copolyester from dimethyl terephthalate, ethylene glycol and 2,2-bis[2,4,6-tribromophenoxymethyl]-1,3-propanediol The polymerization procedure was similar to that of Example 8. The charge was: dimethyl terephthalate (58.2 g., 0.3 moles), ethylene glycol (41 g., 0.66 moles), 2,2-bis[2,4,6-tribromophenoxymethyl]-1,3-propanediol (17.6 g.), zinc acetate dihydrate (0.030 g.) and antimony trioxide (0.018 g.). The resulting amber-colored resin had a melting point of 234° C. (Mettler). A film was obtained by pressing the resin at 250° C. between Teflon sheets in a Carver Press. The film had a L.O.I. value of 26. The theoretical bromine content was 15%.

EXAMPLE 15

Preparation of a copolyester from 2,2-bis(2,4,6-tribromophenoxymethyl)-1,3-propanediol, ethylene glycol, and dimethyl terephthalate The polymerization was carried out in a one-gallon kettle as described in Example 7. The charge was 2,2-bis(tribromophenoxymethyl)-1,3-propanedial (286 g.), dimethyl terephthalate (1552 g.), ethylene glycol (1 liter), zinc acetate dihydrate (0.776 g.), and antimony trioxide (0.388 g.). The resulting resin was light amber in color, had an intrinsic viscosity of 0.5 (½% solution in trifluoroacetic acid) and a melting point of 241° C. (Mettler). It could be crystallized by heating to 130 –140° C. Its theoretical bromine content was 10%.

The resin was extruded into a 9 mil (0.023 cm.) cast web using a 2.5 cm. extruder. Samples of the cast web were oriented 3 × 3 to give a 1 mil (0.0025 cm.) film. Properties of this film were:

| | |
| --- | --- |
| Break strength | 28.5 × 10³ psi(2 × 10³ kg/sq. cm) |
| Break elongation | 80 – 100% |
| L.O.I. | 26 |

EXAMPLE 16

A copolyester of terephthalic acid, (2640 g.), ethylene glycol, (1490 g.), 3,3-bis[pentachlorophenoxymethyl]oxetane (1575 g.), zinc acetate dihydrate (0.91 g.) antimony oxide (0.91 g.), and lithium acetate (0.23 g.) can be prepared in a 2gallon kettle capable of operating under pressure and vacuum. Polymerization can be conducted in essentially the same manner as utilizing essentially the procedure of Example 9. The theoretical chlorine content of this polyester is 20%.

What is claimed is:

1. A copolyester of (a) and (b) units, and optionally (c) units wherein
   a. represents units of the formula

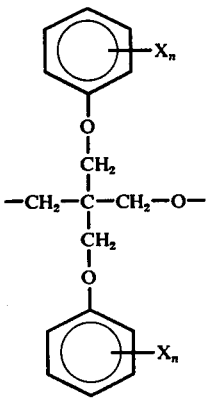

wherein each X is halogen selected from Br and Cl and each *n* is 3 to 5;

b. represents diacid units of the formula

and c. represents —RO— wherein R is a lower aliphatic group containing from 2 to 10 carbon atoms, provided that the copolyester contains at least about five percent of halogen which is contained in the (a) units.

2. A copolyester according to claim 1 wherein X is Br and each *n* is 3.

3. A copolyester according to claim 1 wherein X is Br and one *n* is 3 and the other *n* is 5.

4. A copolyester according to claim 1 wherein X is Cl and each *n* is 5.

5. A copolyester according to claim 1 wherein the carbonyl-oxy and carbonyl groups in the (b) units are meta or para oriented.

6. A copolyester according to claim 5 wherein the carbonyl-oxy and carbonyl groups are para oriented.

7. A copolyester according to claim 1 which contains units of type (c).

8. A copolyester according to claim 1 wherein —RO— is the residue of ethylene glycol.

9. A copolyester according to claim 1 in which the units are limited to types (a) and (b) and the carbonyloxy and carbonyl groups in the (b) units are para oriented.

10. A film of a copolyester according to claim 1.

11. A fiber of a copolyester according to claim 1.

12. A copolyester of (a), (b) and (c) units wherein a. represents units of the formula

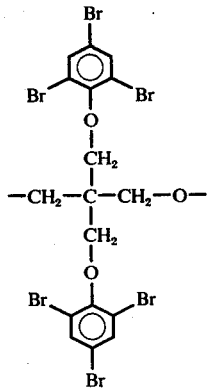

b. represents diacid units of the formula

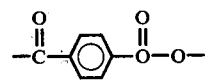

c. represents units of the formula

—CH$_2$—CH$_2$—O— provided that the copolyester contains at least about 5% of halogen which is contained in the (a) units.

* * * * *

UNITED STATES PATENT AND TRADEMARK OFFICE
CERTIFICATE OF CORRECTION

PATENT NO. : 4,014,855
DATED : March 29, 1977
INVENTOR(S) : Robert L. Wear

It is certified that error appears in the above—identified patent and that said Letters Patent are hereby corrected as shown below:

Col. 1, line 53, "nitrogen" should read -- crosslinkable --.
Col. 10, line 11, "dehydrate" should read -- dihydrate --.

Signed and Sealed this nineteenth Day of July 1977

[SEAL]

Attest:

RUTH C. MASON
Attesting Officer

C. MARSHALL DANN
Commissioner of Patents and Trademarks